US00RE41864E

(19) United States
(12) Reissued Patent
Soule et al.

(10) Patent Number: US RE41,864 E
(45) **Date of Reissued Patent: *Oct. 26, 2010**

(54) SWIRL UNIT, ORIFICE PLATE, AND SPRAY NOZZLE INCLUDING SAME

(75) Inventors: Lincoln S. Soule, Hutchison Island, FL (US); Douglas J. Dziadzio, Montague, MA (US); Mark W. Yorns, Longmeadow, MA (US); Paul J. Mueller, Springfield, MA (US); Daniel T. deLesdernier, Greenfield, MA (US); Thomas A. Bassett, Florence, MA (US); Shane Taylor, Quincy, MA (US); Matthew P. Betsold, Northfield, MA (US)

(73) Assignee: Bete Fog Nozzle, Inc., Greenfield, MA (US)

( * ) Notice: This patent is subject to a terminal disclaimer.

(21) Appl. No.: 11/893,091

(22) Filed: Aug. 13, 2007

Related U.S. Patent Documents

Reissue of:
(64) Patent No.: 6,193,172
Issued: Feb. 27, 2001
Appl. No.: 09/322,792
Filed: May 28, 1999

U.S. Applications:

(63) Continuation of application No. 10/373,597, filed on Feb. 25, 2003, now Pat. No. Re. 39,767, which is a continuation-in-part of application No. 08/923,039, filed on Sep. 3, 1997, now Pat. No. 5,934,569.

(51) Int. Cl.
*B05B 1/34* (2006.01)

(52) U.S. Cl. ..... 239/468; 239/461; 239/490; 239/505

(58) Field of Classification Search ..... 239/468, 239/461, 463, 490, 505, 600, 1; 29/890.124, 29/890.127

See application file for complete search history.

(56) References Cited

U.S. PATENT DOCUMENTS

| | | | | |
|---|---|---|---|---|
| 2,904,263 | A | | 9/1959 | Tate et al. |
| 3,304,013 | A | | 2/1967 | O'Brien |
| 3,680,793 | A | | 8/1972 | Tate et al. |
| 3,887,137 | A | | 6/1975 | Nakamura et al. |
| RE30,004 | E | | 5/1979 | Reed |
| 4,367,847 | A | | 1/1983 | Bayer |
| 5,152,463 | A | | 10/1992 | Mao et al. |
| 5,333,790 | A | | 8/1994 | Christopher |
| 5,358,179 | A | | 10/1994 | Lund et al. |
| 5,421,522 | A | | 6/1995 | Bowen |
| 5,934,569 | A | | 8/1999 | Soule et al. |
| RE39,767 | E | * | 8/2007 | Soule et al. ..... 239/468 |

OTHER PUBLICATIONS

Photograph of Prior Art Swirl Unit ("Swirl Unit 1"); Manufactured by Delevan Spray Technologies; date: more than one year prior to Sep. 3, 1997.

Photographs (4) of Prior Art Swirl Unit ("Swirl Unit 2"); Manufactured by Delevan Spray Technologies; date: more than one year prior to Sep. 3, 1997.

* cited by examiner

*Primary Examiner*—Davis Hwu
(74) *Attorney, Agent, or Firm*—McCarter & English, LLP

(57) ABSTRACT

In a spray nozzle (10), a carrier (12) defines a spray aperture (20), a groove (30) surrounding the spray aperture for receiving an o-ring (32), a first locating bore (26) for slidably receiving an orifice plate (14) seated against the o-ring (32) and for aligning the orifice plate with the spray aperture, and a second locating bore (28) for slidably receiving a swirl unit and aligning the swirl unit (16) with the orifice plate and spray aperture. The swirl unit (16) defines on its peripheral surface a recessed flat (58) forming a fluid passageway between the swirl unit and carrier. The swirl unit (16) includes a swirl chamber (60) defined by a curvilinear surface (62) formed within the swirl unit, and an inlet port (64) formed in fluid communication between the swirl chamber and fluid passageway. The nozzle body (18) is threadedly received within the carrier (12) behind the swirl unit (16) to axially press the swirl unit, and in turn press the orifice plate (14) against the adjacent surface of the carrier.

29 Claims, 8 Drawing Sheets

SWIRL UNIT, ORIFICE PLATE, AND SPRAY NOZZLE INCLUDING SAME

Matter enclosed in heavy brackets [ ] appears in the original patent but forms no part of this reissue specification; matter printed in italics indicates the additions made by reissue.

CROSS-REFERENCE TO RELATED [APPLICATION] *APPLICATIONS*

[This patent application is a continuation-in-part of U.S. patent application Ser. No. 08/923,039, filed Sep. 3, 1997, now U.S. Pat. No. 5,934,569, herewith, and incorporated by reference herein.]

*More than one reissue application has been filed for the reissue of U.S. Pat. No. 6,193,172. The reissue applications are the present reissue application, and application Ser. No. 10/373,597.*

*The present reissue application is a continuation of reissue application Ser. No. 10/373,597, filed Feb. 25, 2003, now U.S. Pat. No. RE39767, which is a reissue of U.S. Pat. No. 6,193,172, which is a continuation-in-part of U.S. patent application Ser. No. 08/923,039, filed Sep. 3, 1997, now U.S. Pat. No. 5,934,569, all of which are incorporated by reference herein.*

FIELD OF THE INVENTION

The present invention relates to spray nozzles, and more particularly, to improved spray nozzles of the type employing a swirl unit having a swirl chamber and orifice plate for swirling and emitting a fluid spray.

BACKGROUND INFORMATION

Spray nozzles having centrifugal swirl chambers upstream of the spray orifice have been employed for various uses, such as spray drying, aeration, cooling, and fuel injection. A typical such nozzle is illustrated in U.S. Pat. No. 3,680,793 to Tate et al. which shows in FIG. 1 a nozzle body, an orifice plate defining a spray orifice, and a swirl chamber block received within the nozzle body. A retainer member is threadedly engaged behind the swirl chamber block for retaining and positioning the swirl chamber and orifice plate within the nozzle body. For spray drying applications, fluid containing suspended and dissolved solids is supplied to the nozzle under pressures generally in the range of 500 p.s.i. to 5000 p.s.i. This mixture passes through the nozzle at high velocity, resulting in rapid wear to the swirl chamber block and orifice plate. Because of this rapid wear, the swirl chamber block and orifice plate may require frequent replacement.

In the design of the '793 patent, replacement of these worn components is difficult. In practice, one might place the retainer member on a flat surface with the end for retaining the swirl chamber block facing upwardly. One would then place the swirl chamber block into the recess formed in the end of the retainer member. Next, one would place the nozzle body on a flat surface with its inlet end facing upwardly and the orifice plate would be inserted into the counter-bore formed in the nozzle body. The next step would be either (i) to invert the retainer member and swirl chamber block and insert the inverted components into the nozzle body, or (ii) to invert the nozzle body and orifice plate, and place the inverted components over the retainer member and swirl chamber block. In either case, for the inverted parts, the wear component (either the swirl chamber block or orifice plate) would tend to fall out, thus making assembly extremely difficult.

Another possible assembly method would be to place the retainer member on a flat surface with its downstream end facing upwardly, and to place the swirl chamber block into the recess formed in the upwardly-facing end of the retainer member. Next, the orifice plate would be balanced on top of the swirl chamber block. Finally, the inverted nozzle body would be placed over the stack formed by the retainer member, swirl chamber block and orifice plate, and the nozzle body then would be threaded onto the retainer member. However, this final operation would be problematic because the orifice plate would tend to move during assembly, thus making it difficult to locate the orifice plate within the counter-bore formed in the nozzle body.

Accordingly, it is an object of the present invention to provide an improved spray nozzle, and improved wear components for such nozzles, including swirl units and orifice plates, which overcome the above-described drawbacks and disadvantages encountered in assembling prior art spray nozzles.

SUMMARY OF THE INVENTION

The present invention is directed to a spray nozzle comprising a carrier defining a spray aperture on a downstream end for emitting a spray, a first locating bore formed adjacent to the spray aperture for slidably receiving an orifice plate, and a second locating bore formed on an upstream side of the first locating bore for slidably receiving a swirl unit. The carrier also includes at least one retaining surface, which is preferably formed by a pair of retaining lugs, located on an upstream side of the second locating bore and extending inwardly a predetermined distance for engaging the swirl unit to thereby retain the swirl unit and orifice plate within the carrier.

The orifice plate defines a downstream end surface engageable with the carrier, an upstream end surface axially spaced relative to the downstream end surface and engageable with the swirl unit, a spray orifice formed through the orifice plate, and a peripheral surface formed between the two end surfaces. The peripheral surface is dimensioned for slidably contacting an interior surface forming the first locating bore upon inserting the orifice plate within the bore to thereby support and align the orifice plate with the spray aperture.

The swirl unit includes a downstream end surface engageable with the orifice plate received within the first locating bore, an upstream end surface axially spaced relative to the downstream end surface, a fluid passageway formed at least in part between the two end surfaces for swirling the fluid passed therethrough, and a peripheral surface extending between the two end surfaces. The peripheral surface defines at least two locating surfaces formed on approximately opposite sides of the swirl unit relative to each other, and dimensioned for slidably contacting an interior surface of the second locating bore upon inserting the swirl unit within the bore in order to support and align the swirl unit with the orifice plate and spray aperture. The peripheral surface also defines at least one recessed surface, such as a flat, spaced radially inwardly from the at least two locating surfaces a distance greater than the predetermined distance defined by the at least one retaining surface for clearing the retaining surface upon inserting the swirl unit into the second locating bore. A tool-engaging surface, such as a slot or other recess for receiving and engaging a screw driver or other tool, is formed on the second end surface of the swirl unit. The slot is engageable with the tool for pressing the swirl unit toward the orifice plate, and in turn rotating the swirl unit and second end surface into position for engagement with the at least one retaining surface to thereby secure within the carrier the swirl unit and orifice plate.

One advantage of the nozzle of the present invention, is that the retaining surface(s) of the carrier permit the orifice plate and swirl unit to be easily installed and retained within the carrier to thereby form a sub-assembly which may be inverted or otherwise turned into any position without causing the wear components to fall out or otherwise move out of alignment with the spray aperture of the carrier. The nozzle body may then be inserted into the carrier, or the carrier may be placed over the nozzle body, to fixedly secure the nozzle body to the carrier and thereby complete the nozzle assembly. As a result, the nozzle may be assembled without encountering the above-described drawbacks and disadvantages associated with assembling prior art spray nozzles.

Other objects and advantages of the present invention will become apparent in view of the following detailed description and accompanying drawings.

DETAILED DESCRIPTION OF THE PREFERRED EMBODIMENTS

Figure 2:
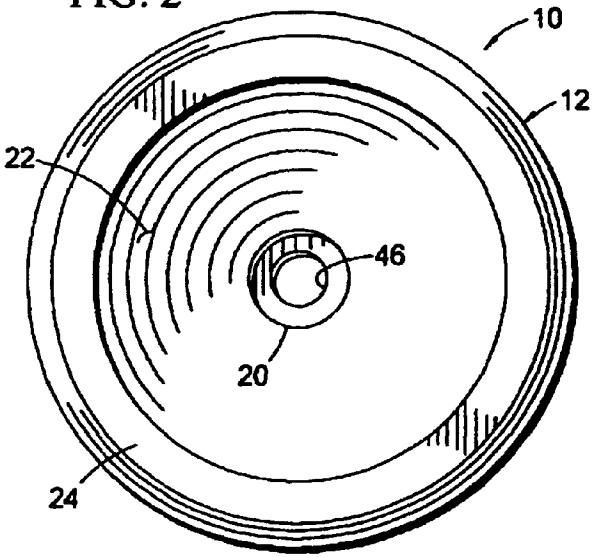
FIG. 2 is an elevational view of the spray nozzle taken from the right side of FIG. 1.
Figure 1:
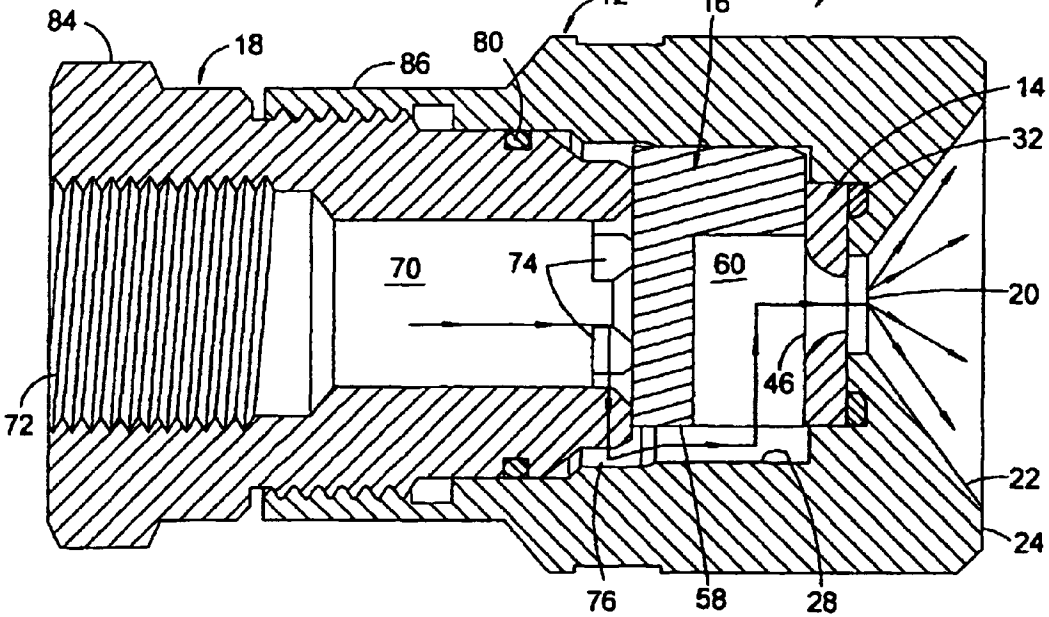
FIG. 1 is a cross-sectional view of a spray nozzle embodying the present invention.
Figure 3:
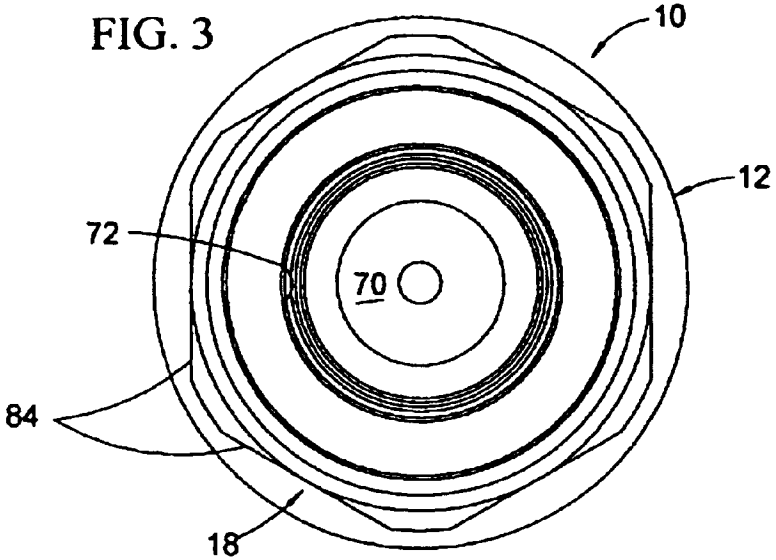
FIG. 3 is an elevational view of the spray nozzle taken from the left side of FIG. 1 with the swirl unit and orifice plate removed.

In FIGS. 1–3, a spray nozzle embodying the present invention is indicated generally by the reference numeral 10. The spray nozzle 10 comprises a carrier 12, an orifice plate 14 and swirl unit 16 slidably received and retained within the carrier, and a nozzle body 18 secured within the carrier behind the swirl unit and orifice plate. The carrier 12 defines on its downstream end a spray aperture 20, and a conical-shaped exit surface 22 formed between the spray aperture and adjacent end surface 24 of the carrier for emitting an approximately conical-shaped spray pattern. The terms "upstream" and "downstream" are used herein with the understanding that the fluid will flow through the spray nozzle in the direction indicated by the arrows in FIG. 1, i.e., the fluid will enter from the upstream end of the nozzle body 18 and exit through the spray aperture 20 at the downstream end of the carrier 12.

Figure 4:
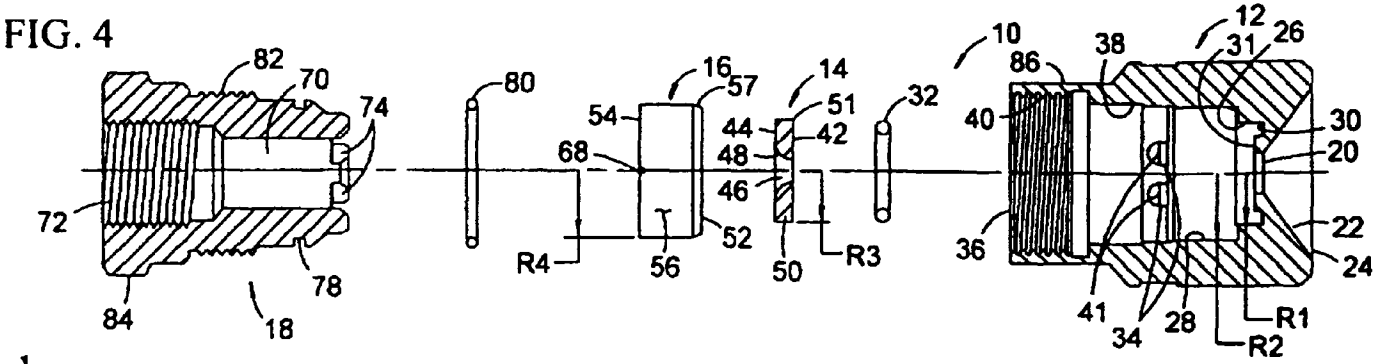
FIG. 4 is an exploded, partial cross-sectional view of the spray nozzle of FIG. 1.

As shown more clearly in FIG. 4, the carrier 12 further defines a first locating bore 26 formed adjacent to the spray aperture 20 and approximately defined by a first radius "R1" for slidably receiving the orifice plate 14, and a second locating bore 28 formed adjacent to the first locating bore and approximately defined by a second radius "R2" for slidably receiving the swirl unit 16. A groove 30 is formed within the base surface 31 of the first locating bore 26 and extends about the periphery of the spray aperture 20 for receiving a sealing member 32, such as an o-ring or like gasket, and the sealing member forms an approximately fluid-tight seal between the orifice plate and carrier.

The spray nozzle 10 further includes means for retaining the orifice plate 14 and swirl unit 16 within the carrier 12. In the preferred embodiment of the invention, the means for retaining includes a pair of retaining lugs or like retaining members 34 formed adjacent to the opposite end of the second locating bore 28 relative to the first locating bore 26. As shown typically in FIG. 12, the two retaining lugs 34 are angularly spaced relative to each other and project inwardly a predetermined distance "d1". As shown in FIG. 4, each retaining lug 34 defines an approximately planar retaining surface 41 for engaging the adjacent end surface of the swirl unit and retaining the swirl unit and orifice plate within the carrier.

As will be recognized by those skilled in the pertinent art, the retaining members and/or retaining surfaces may take any of numerous different shapes and configurations for purposes of retaining the swirl unit and orifice plate within the carrier in accordance with the present invention. For example, the retaining surfaces 41 may be inclined or ramped in order to facilitate engaging and retaining the swirl unit within the carrier. Similarly, a different number of retaining members and/or retaining surfaces may be employed. For example, a single retaining surface may be employed, or alternatively, additional retaining members may be provided. In each case, a corresponding recess will be formed on the swirl unit for each retaining surface in order to clear the retaining surfaces upon inserting the swirl unit into the carrier, as is described further below.

As also shown in FIG. 4, the carrier 12 further defines an entrance aperture 36, a guide bore 38 formed between the second locating bore 28 and entrance aperture 36 for receiving the swirl unit 16 and orifice plate 14 therethrough, and a threaded portion 40 for threadedly securing the nozzle body 18 within the carrier 12.

The orifice plate 14 defines a first (or downstream) approximately planar end surface 42 engageable with the base surface 31 of the first locating bore 26 and sealing member 32 received within the groove 30; a second (or upstream) approximately planar end surface 44 engageable with the adjacent end surface of the swirl unit 16; a spray orifice 46 extending through the center of the plate and defined by a radiused inlet 48; and a peripheral surface 50 extending between the first and second end surfaces. A bevel or chamfer 51 is formed at the juncture of the peripheral surface 50 and first end surface 42 for facilitating insertion of the orifice plate 14 into the first locating bore 26.

The peripheral surface 50 defines at least two locating surfaces (or surface sections) formed on opposite sides of the orifice plate 14 relative to each other, and dimensioned to slidably contact the interior surface forming the first locating bore 26 upon inserting the orifice plate 14 within the bore to thereby support the orifice plate 14 and align the orifice 46 with the spray aperture 20. In the embodiment of the present invention illustrated, the peripheral surface 50 has a circular shape defined by a radius "R3" which is approximately equal to (but slightly less than) the first radius "R1" of the first locating bore 26, and therefore the locating surface sections are formed by the continuous peripheral surface in order to slidably receive and retain the orifice plate 14 within the bore. The clearance between the radii R1 and R3 is preferably within the range of approximately 0.0005 through 0.0035 inch. As will be recognized by those skilled in the pertinent art, the peripheral surface 50 may take any of numerous different shapes and configurations, and the locating surfaces (or surface sections) may likewise take other shapes and configurations for purposes of supporting and aligning the orifice plate 14 within the carrier 12.

As shown in FIGS. 5–8, the swirl unit 16 defines a first (or downstream) approximately planar end surface 52 engageable with the adjacent surface 44 of the orifice plate 14 received within the first locating bore 26, and a second (or upstream) approximately planar end surface 54 axially spaced relative to the first end surface. A peripheral surface 56 extends between the first and second end surfaces 52 and 54, respectively, and defines at least two locating surfaces (or surface sections) formed on approximately opposite sides of the swirl unit 16 relative to each other and dimensioned for slidably contacting the interior surface defining the second locating bore 28 upon inserting the swirl unit therein for supporting and aligning the swirl unit 16. A tapered surface, bevel or chamfer 57 is formed at the junction of the peripheral surface 56 and the first end surface 52 for facilitating insertion of the swirl unit into the second locating bore 28. In the preferred embodiment, the peripheral surface 56 has a circular shape defined by a radius "R4" which is approximately equal to (but slightly less than) the second radius "R2" of the second locating bore 28, and therefore the at least two locating surface sections are formed by the continuous peripheral surface. The clearance between the radii R2 and R4 is preferably within the range of approximately 0.0035 through 0.0060 inch. As will be recognized by those skilled in the pertinent art, the peripheral surface 56 may take any of numerous different shapes and configurations, and therefore the locating surfaces (or surface sections) may likewise take other shapes and configurations for purposes of supporting and aligning the swirl unit 16 within the carrier 12.

The swirl unit 16 further defines at least one recessed surface 58 spaced radially inwardly a distance "d2" from the radius R4 defining the peripheral surface 56. The distance d2 is greater than the distance d1 defined by the retaining lugs 34 in order to clear the lugs with the recessed surface 58 upon inserting the swirl unit into the second locating bore 28. In the preferred embodiment, the recessed surface 58 is defined by a flat formed on the peripheral surface 56 and therefore is approximately planar. However, as will be recognized by those skilled in the pertinent art, the recessed surface 58 (or surfaces) may take any of numerous other shapes and configurations without departing from the scope of the present invention.

Figure 7:
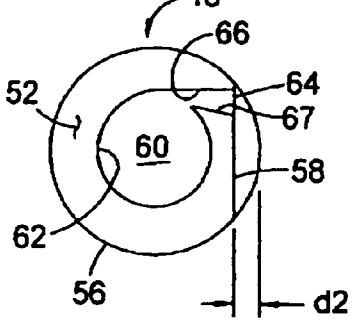
FIG. 7 is an elevational view of the swirl unit taken from the right side of FIG. 1 and illustrating the swirl chamber and inlet port.
Figure 6:
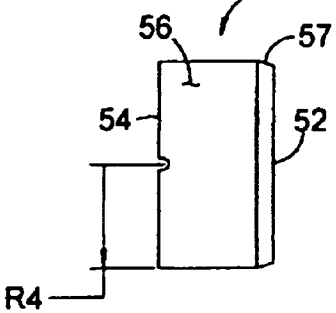
FIG. 6 is a side elevational view of the swirl unit of FIG. 5.
Figure 5:
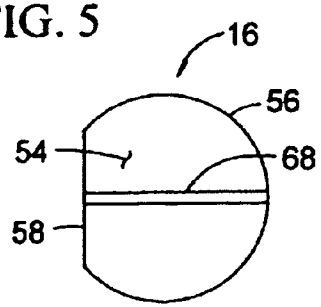
FIG. 5 is an elevational view of the swirl unit of the nozzle of FIG. 1 taken from the left side of FIG. 1.
Figure 8:
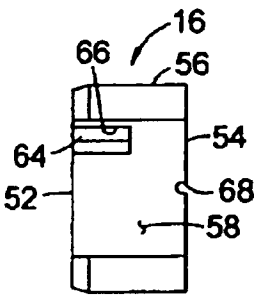
FIG. 8 is another side elevational view of the swirl unit illustrating the flat formed in the peripheral surface for clearing the retaining lugs upon inserting the swirl unit into the carrier.

As shown in FIG. 7, a swirl chamber 60 is formed within the swirl unit 16 and is defined by an approximately spiral interior surface 62. An inlet port 64 is formed through the recessed surface 58 in fluid communication with the swirl chamber 60, and is defined by a first inlet surface 66 formed tangential to the spiral surface 62 and a second inlet surface 67 spaced apart from and facing the first inlet surface 66. A tool-engaging surface 68 is formed on the second end surface 54, and as is described further below, this surface is engageable with a tool (not shown) for pressing the swirl unit 16 against the orifice plate 14, and in turn rotating the swirl unit and second end surface 54 thereof into position for engagement with the retaining lugs 34 to thereby secure within the carrier 12 the swirl unit and orifice plate. In the preferred embodiment, the tool-engaging surface 68 is defined by an elongated slot extending across the second end surface 54 for receiving a screw driver or like tool. As will be recognized by those skilled in the art, however, the tool-engaging surface may take any of numerous different shapes and configurations without departing from the scope of the invention. For example, the tool-engaging surface may take the form of a hex-shaped recess for receiving a hex-shaped tool, or may be defined by a protuberance having a surface contour conforming to the contour of one or more tools for engagement and manipulation by such tool(s).

As shown in FIG. 4, the nozzle body 18 defines a cylindrical fluid conduit 70 extending along the central axis of the body, and an internal threaded portion 72 formed at the upstream end of the conduit for attachment to a fluid delivery conduit (not shown) in order to deliver the fluid to be sprayed to the nozzle body. As shown best in FIG. 1, a plurality of slots 74 are formed on the downstream end of the nozzle body in order to couple the fluid conduit 70 in fluid communication with an annular chamber 76 formed between the nozzle body and carrier 12. As indicated by the arrows in FIG. 1, the fluid flows through the conduit 70 and slots 74 of the nozzle body, through the annular chamber 76 and space formed between the recessed surface 58 and second locating bore 28, through the swirl chamber 60, and in turn through the orifice 46 and spray aperture 20 where the fluid is emitted in an approximately conical-shaped spray pattern. An external annular (or circumferential) groove 78 is formed adjacent to the downstream end of the nozzle body for receiving a sealing member 80, such as an o-ring or other suitable gasket, for forming an approximately fluid-tight seal between the nozzle body and carrier. The nozzle body 18 further defines an external threaded portion 82 for threadedly engaging the threaded portion 40 of the carrier 12 and in turn fixedly securing the nozzle body to the carrier. The nozzle body 18 also defines several external flats 84, and the carrier 12 similarly defines external flats 86 for engaging the flats with a tool, such as a wrench, and tightening the nozzle body to the carrier.

Figure 9:
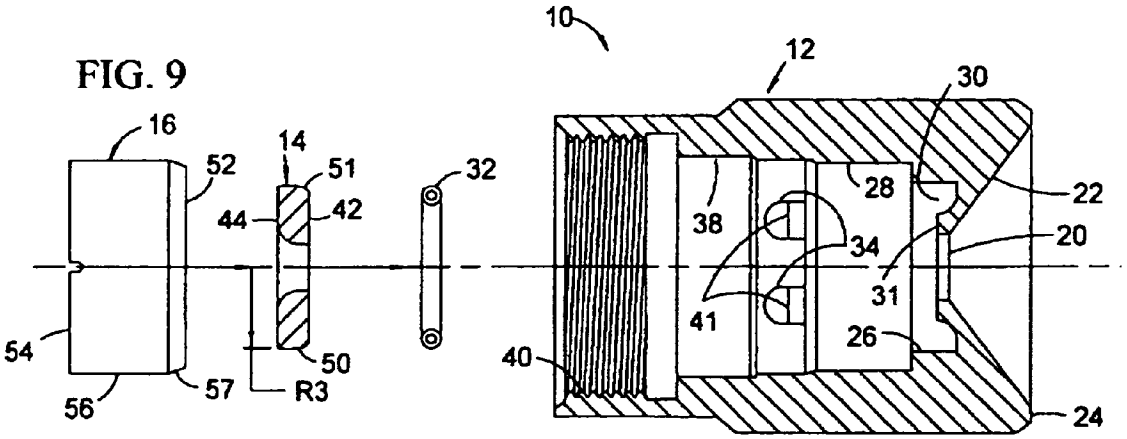
FIG. 9 is an exploded, partial cross-sectional view illustrating the first stage assembly of the swirl unit, orifice plate and o-ring prior to insertion within the carrier.
Figure 11:
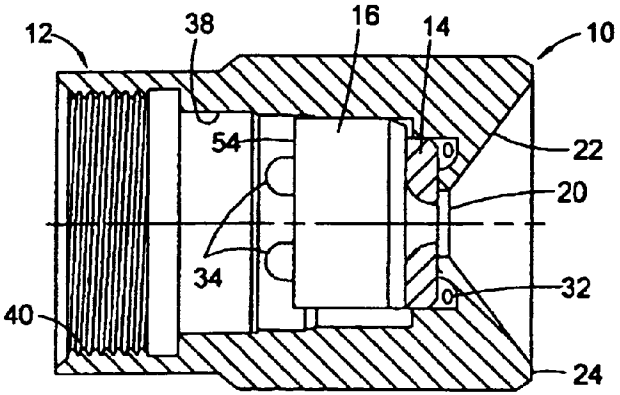
FIG. 11 is a partial cross-sectional view illustrating the sub-assembly of the swirl unit, orifice plate and o-ring retained within the carrier.
Figure 10:
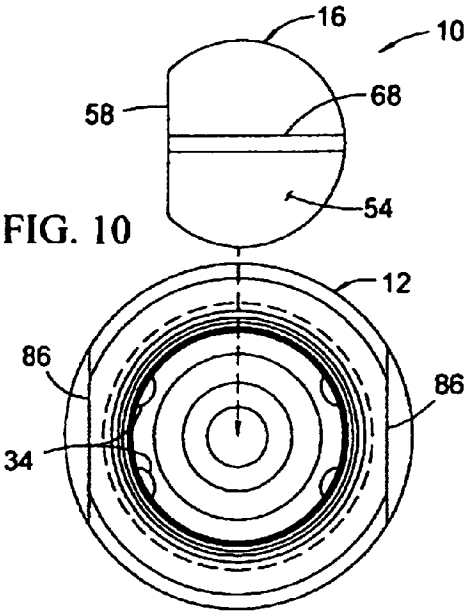
FIG. 10 is an end elevational view of the swirl unit and carrier illustrating the procedure for aligning the swirl unit relative to the retaining lugs prior to inserting the swirl unit into the carrier.
Figure 12:
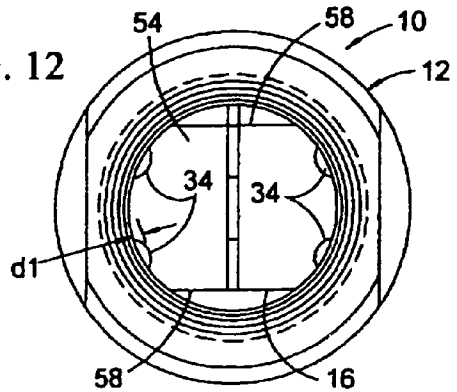
FIG. 12 is an elevational view of the sub-assembly taken from the left side of FIG. 11.

The assembly of the nozzle 10 proceeds in two stages. The first stage shown in FIGS. 9–12 allows the o-ring 32, orifice plate 14 and swirl unit 16 to be positively located in relation to each other and fixedly secured and aligned within the carrier 12, and the second stage shown in FIG. 1 completes the assembly with the nozzle body 18 fixedly secured within the carrier behind the swirl unit and orifice plate. To begin the first stage of assembly, and with reference to FIG. 9, the o-ring 32 is inserted into the groove 30 of the carrier 12 and the orifice plate 14 is inserted within the first locating bore 26 behind the o-ring. The chamfer 51 guides the orifice plate into position so that the radius R3 of the peripheral surface 50 will locate the orifice plate concentrically within the carrier. Next, as shown in FIG. 10, the recessed surface or flat 58 of the swirl unit 16 is aligned with the retaining lugs 34 of the carrier and the swirl unit is inserted into the guide bore 38 and second locating bore 28 until the first end surface 52 thereof contacts the orifice plate 14. At this point, the second end surface 54 of the swirl unit is not in clearance of the retaining surfaces 41 of the retaining lugs 34. Accordingly, a screw driver or like tool (not shown) is then inserted into the slot 68 forming the tool-engaging surface of the swirl unit 16, and sufficient axial force is imparted by the screw driver to compress the o-ring 32 and in turn cause the swirl unit to move further into the first locating bore 28 until the second end surface 54 of the swirl unit is in clearance to the retaining surfaces 41 of the retaining lugs 34. Then, as shown in FIG. 12, the screw driver and swirl unit 16 are rotated approximately 90° in order to move the flat 58 of the swirl unit out of alignment with the retaining lugs 34. The axial force of the screw driver is then released, allowing the o-ring 32 to expand and move the swirl unit 16 until its second end surface 54 engages the retaining surfaces 41 of the retaining lugs 34. As shown in FIGS. 11 and 12, the carrier 12, o-ring 32, orifice plate 14, and swirl unit 16 are then locked in a subassembly that can be turned in any direction without the o-ring, orifice plate and swirl unit falling out of the carrier.

The second stage of the assembly process connects the nozzle body 18 to the sub-assembly of FIG. 11 (i.e., the carrier, swirl unit, o-ring and orifice plate). To begin the second stage of assembly, the o-ring 80 is placed in the circumferential groove 78 of the nozzle body. Then, the sub-assembly is threaded onto the nozzle body with the threads 40 of the carrier engaging the threads 82 of the body, and the parts are tightened by hand or with appropriate tools in order to cause the first end surface 42 of the orifice plate 14 to compress the o-ring 32 until the first end surface 42 of the orifice plate comes into contact with the base surface 31 of the first locating bore 26.

Turning to FIGS. 13–16, another spray nozzle embodying the present invention is indicated generally by the reference numeral 110. The spray nozzle 110 is substantially similar to the spray nozzle 10 described above, and therefore like reference numerals preceded by the numeral 1 are used to indicate like elements. The primary difference between the spray nozzle 110 and the spray nozzle 10 is the means for swirling the fluid to be sprayed.

Figure 13:
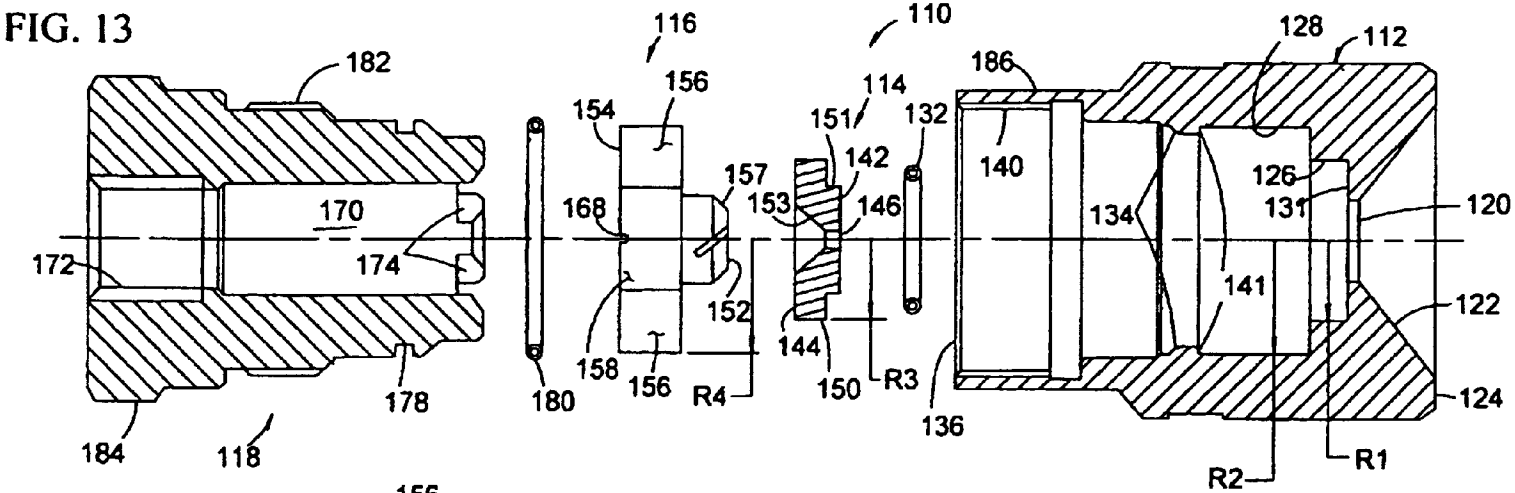
FIG. 13 is an exploded, partial cross-sectional view of another spray nozzle embodying the present invention, wherein the swirl unit and orifice plate define mating conical surfaces and angular slots formed between the conical surfaces for swirling the fluid to be sprayed.
Figure 14:
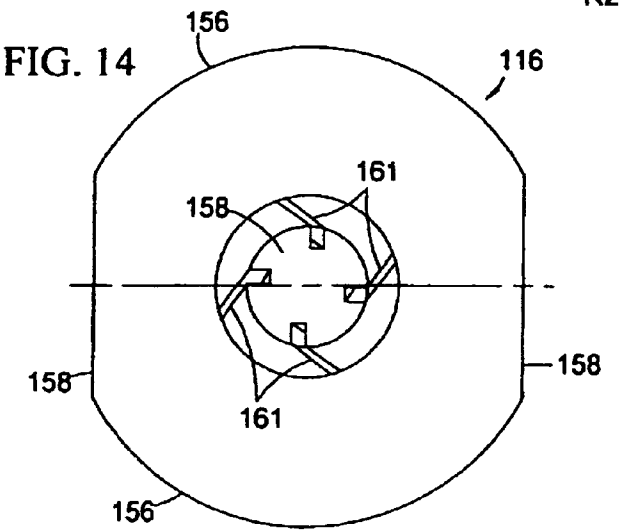
FIG. 14 is an end elevational view of the swirl unit of the spray nozzle taken from the right side of FIG. 13.
Figure 15:
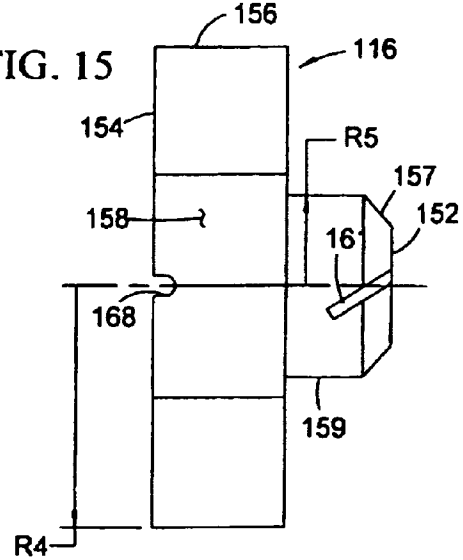
FIG. 15 is a side elevational view of the swirl unit of FIG. 14.

As shown in FIGS. 14 and 15, the swirl unit 116 includes a first peripheral surface 156 defined by the radius "R4" which is approximately equal to (but slightly less than) the second radius "R2" of the second locating bore 128 of the carrier 112. As shown in FIG. 13, the carrier 112 defines retaining lugs or like retaining members 134 formed on diametrically opposite sides of the carrier relative to each other. Accordingly, as shown best in FIG. 14, the swirl unit 116 defines a pair of corresponding recessed surfaces or flats 158 for clearing the retaining lugs upon inserting the swirl unit into the carrier. As shown best in FIG. 15, the swirl unit 116 further includes a second peripheral surface 159 defined by a radius "R5" which is less than the radius "R4" of the first peripheral surface 156, and a conical surface 157 formed between the second peripheral surface and the downstream end surface 152. A plurality of slots 161 defining fluid passageways (at least two) are formed within the conical surface 157 and extend at least partially along the second peripheral surface 159. As shown in FIGS. 14 and 15, the slots 161 are angularly spaced relative to each other, and each is formed at a compound angle with respect to the axis of the swirl unit 116. Accordingly, as described further below, the angled slots 161 cause the fluid to rotate or swirl upon passage therethrough.

As shown in FIG. 13, the orifice plate 114 includes a first peripheral surface 150 defined by a radius "R3" which is approximately equal to (but slightly less than) the first radius "R1" of the first locating bore 126 of the carrier 112 in order to slidably receive and retain the orifice plate within the first locating bore. A second peripheral surface 151 is formed between the first peripheral surface 150 and the downstream end surface 142, and is spaced inwardly from the first peripheral surface for receiving thereabouts the o-ring or like sealing member 132 in order to form a fluid-tight seal between the orifice plate and carrier. This feature is particularly advantageous for lower-flow nozzles in which the diameters of the carrier and orifice plate are relatively small and it is impractical to manufacture a groove in the carrier itself for receiving the o-ring 132.

Figure 16:
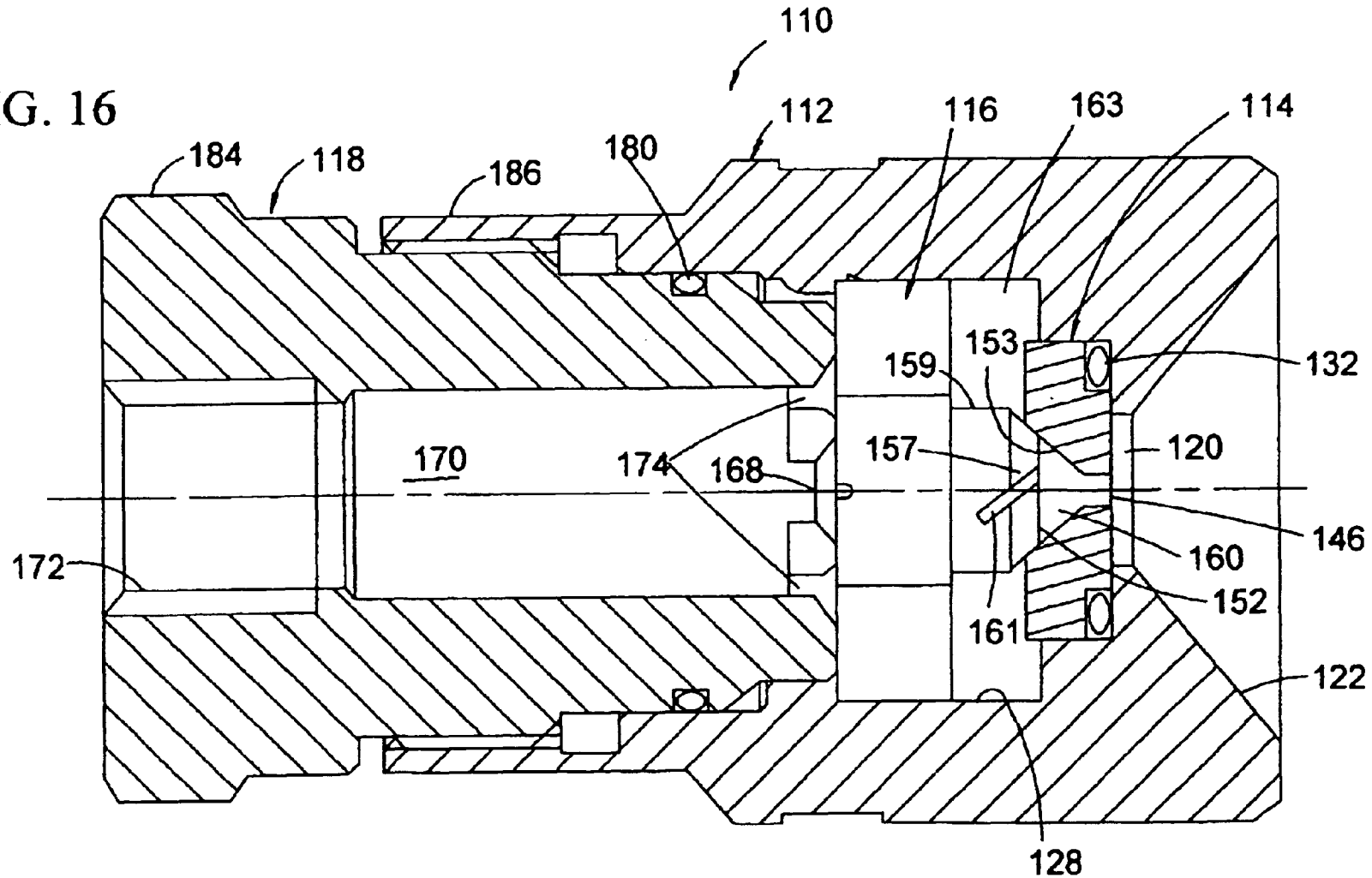
FIG. 16 is a cross-sectional view of the spray nozzle of FIG. 13 in assembled form.

As shown in FIG. 13, the orifice plate 114 further defines a conical-shaped inlet surface 153 formed between the orifice 146 and upstream end surface 144, and which defines a contour substantially conforming to the contour of the conical surface 157 of the swirl unit 116. Accordingly, as shown in FIG. 16, upon inserting the swirl unit 116 into the second locating bore 128 of the carrier 112, the conical surface 153 of the orifice plate 114 receives and conformably contacts the conical surface 157 of the swirl unit 116. As a result, a swirl chamber 160 is formed within the space between the downstream end surface 152 of the swirl unit and the orifice 146 of the orifice plate. In addition, an annular chamber 163 is formed between the second peripheral surface 159 of the swirl unit 116 and the second locating bore 128 of the carrier 112 for receiving the fluid prior to passage through the slots 161 and swirl chamber 160.

The spray nozzle 110 is assembled in two stages in the same manner as described above in relation to the spray nozzle 10. In the first stage, the o-ring 132, orifice plate 114 and swirl unit 116 are positively located in relation to each other and fixedly secured and aligned within the carrier 112. In the second stage, the nozzle body 118 is threadedly connected to the sub-assembly comprising the carrier 112, o-ring 132, orifice plate 114 and swirl unit 116 in order to complete the nozzle assembly as shown in FIG. 16. In the operation of the nozzle 110, and with reference to FIG. 16, the fluid flows through the conduit 170 and slots 174 of the nozzle body 118, through the spaces formed between the flats 158 of the swirl unit and the second locating bore 128, through the annular chamber 163 and slots 161, through the swirl chamber 160, and in turn through the orifice 146 and spray aperture 120 where the fluid is emitted in an approximately conical-shaped spray pattern.

In FIGS. 17–20 another spray nozzle embodying the present invention is indicated generally by the reference numeral 210. The spray nozzle 210 is substantially the same as the spray nozzles 10 and 110 described above, and therefore like reference numerals preceded by the numeral "2", or preceded by the numeral "2" instead of the numeral "1", are used to indicate like elements. The primary difference between the spray nozzle 210 and the spray nozzles described above is that the spray nozzle 210 does not include the retaining lugs or like retaining members 34, 134 to retain the swirl unit 216 and orifice plate 214 within the carrier 212. Rather, the swirl unit and orifice plate are fixedly secured within the carrier by the nozzle body 218 upon threadedly securing the nozzle body within the carrier. Otherwise, the nozzle body, carrier, swirl unit and orifice plate are essentially the same as the corresponding components in one or more of the above-described embodiments of the invention.

Figure 18:
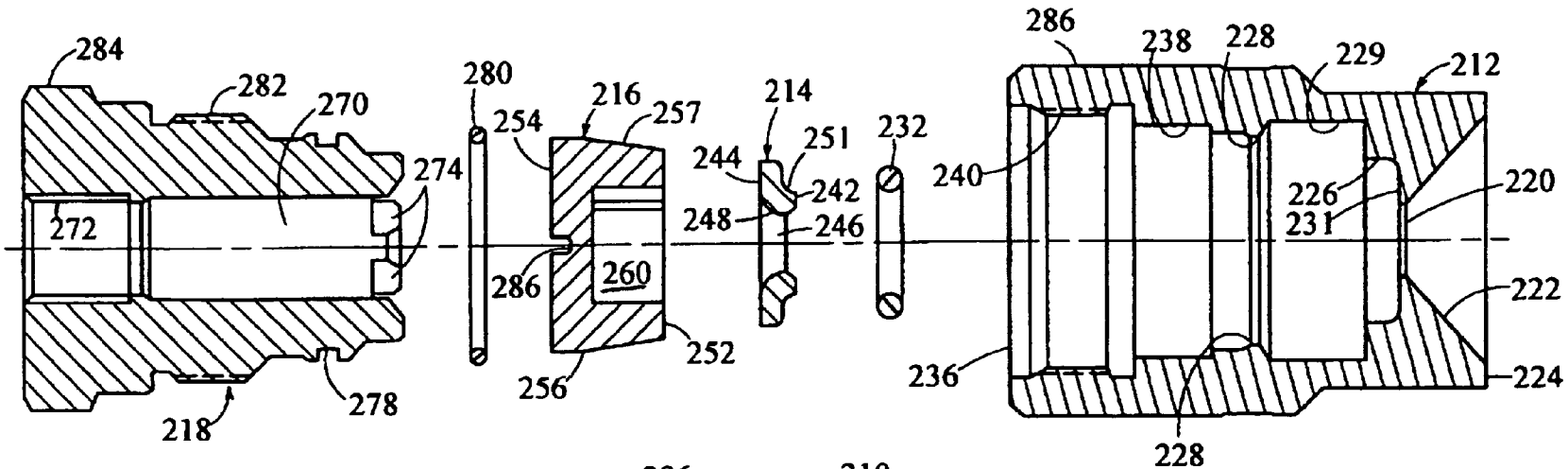
FIG. 18 is an exploded cross-sectional view of the spray nozzle of FIG. 17.
Figure 17:
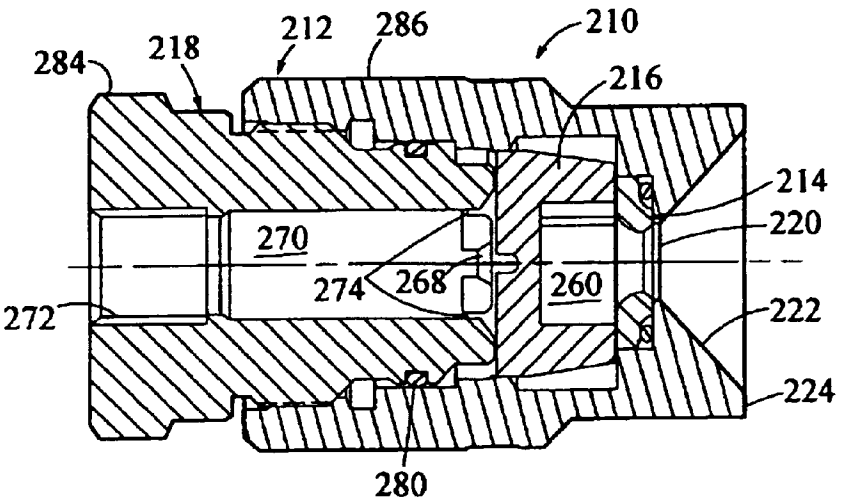
FIG. 17 is a cross-sectional view of another spray nozzle embodying the present invention.
Figure 19:
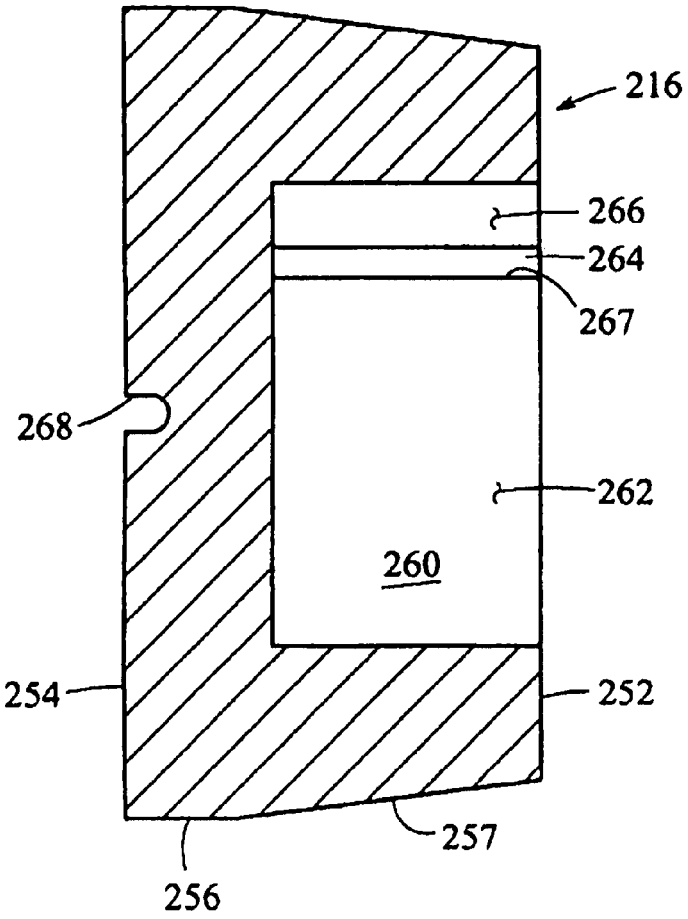
FIG. 19 is an enlarged cross-sectional view of the swirl unit of the spray nozzle of FIG. 17.
Figure 20:
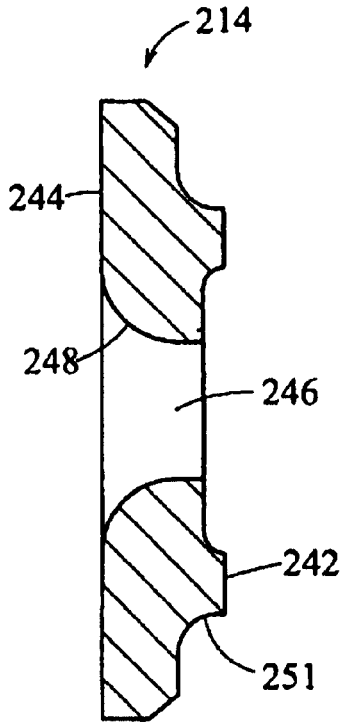
FIG. 20 is an enlarged cross-sectional view of the orifice plate of the spray nozzle of FIG. 17.

Although not shown, the swirl unit 216 preferably includes one or more recessed surfaces essentially the same as the recessed surfaces 58, 158 described above and spaced radially inwardly from the at least two locating surfaces of the peripheral surface 256. As in the embodiments described above, the at least one recessed surface defines a fluid passageway between the swirl unit and carrier for directing fluid into the swirl chamber 260 and, in turn, discharging the fluid in a swirling pattern therefrom. As shown best in FIG. 19, the tapered surface 257 of the swirl unit extends along a substantial portion of the width of the swirl unit and tapers inwardly from the peripheral surface 256 toward the first end surface 252. In addition, as shown in FIGS. 17 and 18, the carrier 212 defines an additional bore 229 formed between the first locating bore 226 and second locating bore 228 and extending along a substantial portion of the width of the swirl unit. As shown in FIG. 17, the surfaces forming the bore 229 are spaced away from the peripheral surface 256 and tapered surface 257 of the swirl unit to avoid contact with the swirl unit. As a result, only the relatively narrow peripheral surface 256 of the swirl unit contacts the relatively narrow surface forming the second locating bore 228, thus reducing the surface contact between the swirl unit and carrier and facilitating removal of the swirl unit from the carrier.

Figure 22:
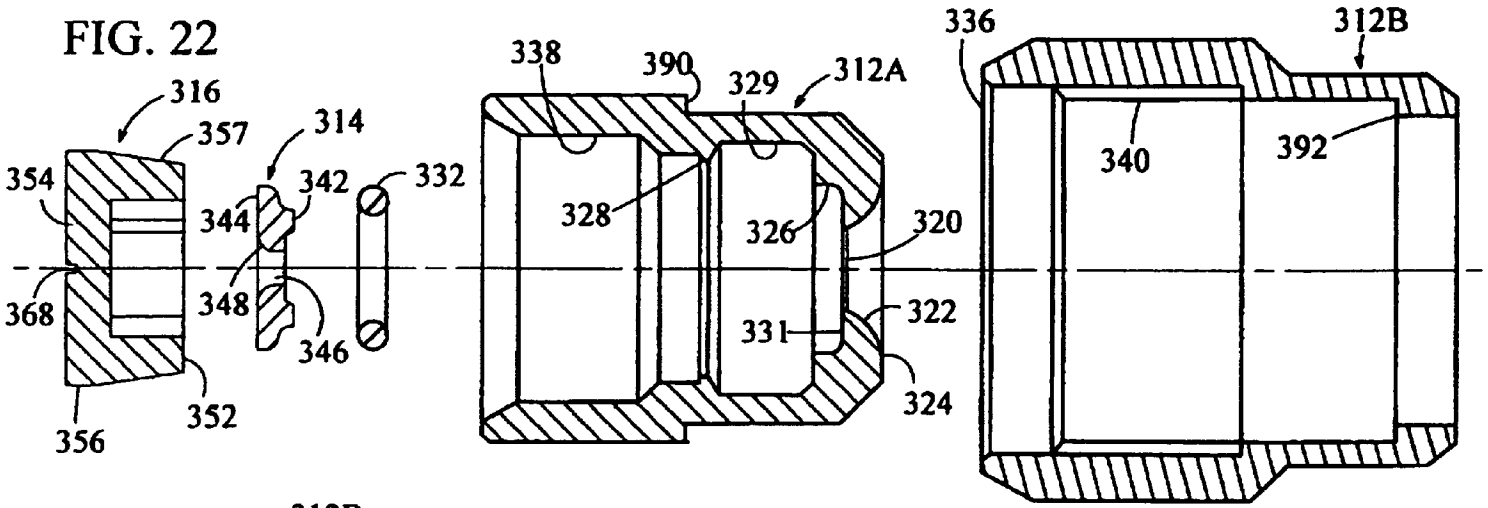
FIG. 22 is an exploded cross-sectional view of the spray nozzle of FIG. 21.
Figure 21:
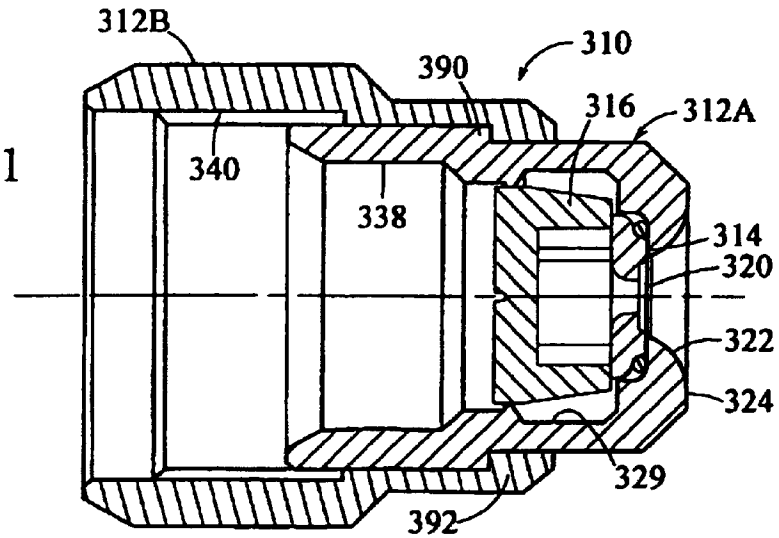
FIG. 21 is a cross-sectional view of another spray nozzle embodying the present invention.

In addition, like the embodiment of FIGS. 13–16, the orifice plate 214 defines a second peripheral surface 251 formed between the first peripheral surface 250 and downstream end surface 242 to thereby define a peripheral groove on the orifice plate for receiving the o-ring or like sealing member 232. One advantage of this feature of the nozzles 110 and 210 is that the base surface 131, 231 of the respective carrier need not define an o-ring or similar groove, like the groove 30 of the nozzle 10 of FIG. 1. As a result, the base surface of the respective carrier can be approximately planar, thus facilitating the ability to clean particles or other debris from the base surface of the carrier that otherwise might become lodged or embedded within a relatively narrow o-ring or like groove. In FIGS. 21 and 22 another spray nozzle embodying the present invention is indicated generally by the reference numeral 310. The spray nozzle 310 is substantially the same as the spray nozzle 210 described above, and therefore like reference numerals preceded by the numeral "3" instead of the numeral "2" are used to indicate like elements. The primary difference between the spray nozzle 310 and the spray nozzles described above is that the carrier is formed in two parts, 312A and 312B. As shown, the first carrier part 312A includes the above-described features for receiving the swirl unit 316, orifice plate 314 and o-ring 332, and the second carrier part 312B includes the above-described features for threadedly retaining the nozzle body (not shown) within the carrier. The first carrier part 312A defines an outwardly projecting lip 390, and the second carrier part 312B defines a corresponding inwardly projecting lip 392. The nozzle 310 is assembled by slidably moving the first carrier part 312A into the second carrier part 312B until the corresponding lips 390, 392 engage one another to thereby seat the first carrier part within the second carrier part, as illustrated in FIG. 21. The swirl unit 316, orifice plate 314 and o-ring 332 may be installed within the first carrier part 312A either before or after insertion of the first carrier part into the second carrier part. Then, the components of the nozzle assembly are fixedly secured together by threadedly receiving the nozzle body (not shown) within the first and second carrier parts in the same manner that the nozzle body 218 is threadedly received within the carrier 212 of nozzle 210 as described above.

Like the spray nozzle 210, the spray nozzle 310 does not include the retaining lugs or like retaining members 34, 134 to retain the swirl unit 316 and orifice plate 314 within the first carrier part 312A. Rather, the swirl unit and orifice plate are fixedly secured within the carrier by the nozzle body (not shown) upon threadedly securing the nozzle body within the carrier. Otherwise, the nozzle body, carrier, swirl unit and orifice plate are essentially the same as the corresponding components in one or more of the above-described embodiments of the invention. Alternatively, as with the spray nozzle 210, the spray nozzle 310 may include retaining lugs or like retaining members in order to retain the swirl unit and orifice plate within the first carrier part 312A in the same manner as described above in connection with the nozzles 10 and 110.

As will be recognized by those skilled in the pertinent art, numerous changes or modifications may be made to the above-described and other embodiments of the present invention without departing from its scope as defined in the appended claims. For example, as indicated in broken lines in FIG. 12, the carrier 12 may include a second pair of retaining lugs 34 formed on the opposite side of the carrier relative to the first pair of retaining lugs, and the swirl unit 16 unit may include a second recessed surface or flat 58 for clearing the second pair of lugs. As described above, the retaining surface(s) and corresponding recessed surface(s) on the swirl unit may take any of numerous different shapes and configurations. Similarly, it may be desirable to form the carrier 12 in two parts as described above in connection with FIGS. 21 and 22, wherein the first carrier part may include the above-described features for retaining the swirl unit, orifice plate and o-ring, the second carrier part may include the above-described features for retaining the nozzle body, and one or both of the carrier parts may include means for fixedly securing the parts together (such as a flange on one part and a threaded retaining nut on the other). In addition, although the first and second locating bores of the carrier are each defined in the preferred embodiments by cylindrical surfaces, each bore may equally be formed by a surface defining another shape, such as an oval or other more unique configuration. In each case, the peripheral surfaces of the swirl unit and/or orifice plate would define at least two locating surfaces dimensioned to be slidably received within the respective bore in the manner described above in order to support and align the respective wear component within the carrier. As also indicated above, the swirl unit and/or orifice plate may take any of numerous different configurations for purposes of rotating or swirling the fluid, or otherwise manipulating the fluid flow in a manner intended to achieve a desired result. Accordingly, this detailed description of preferred embodiments is to be taken in an illustrative, as opposed to a limiting sense.

What is claimed is:

[1. A swirl unit for a spray nozzle, wherein the spray nozzle includes a carrier defining a spray aperture on one end for emitting a spray, a first pair of locating surfaces formed on approximately opposite sides of the carrier relative to each other and axially spaced adjacent to the spray aperture for receiving an orifice plate, and a second pair of locating surfaces formed on approximately opposite sides of the carrier relative to each other and formed on an opposite side of the first pair of locating surfaces relative to the spray aperture for receiving the swirl unit, wherein the swirl unit comprises:

a first end surface engageable with an orifice plate received within the carrier adjacent to the first locating surfaces; a second end surface axially spaced relative to the first end surface; a peripheral surface formed between the first and second end surfaces, wherein the peripheral surface defines at least two locating surfaces formed on approximately opposite sides of the swirl unit relative to each other and dimensioned for slidably contacting the second locating surfaces of the carrier upon inserting the swirl unit therein; at least one recessed surface spaced radially inwardly from the at least two locating surfaces of the swirl unit to thereby define a fluid passageway between the swirl unit and carrier; and a swirl chamber defined by an approximately curvilinear surface, and an inlet port formed in fluid communication between the swirl chamber and fluid passageway and defined at least in part by an inlet surface formed between the curvilinear surface and the recessed surface.]

[2. A swirl unit as defined in claim 1, wherein the carrier further defines at least one retaining surface located on an opposite side of the second pair of locating surfaces relative to the first pair of locating surfaces and extending inwardly a predetermined distance for retaining the swirl unit within the carrier, and the at least one recessed surface of the swirl unit is spaced radially inwardly from the at least two locating surfaces of the swirl unit a distance greater than the predetermined distance defined by the at least one retaining surface of the carrier for clearing the retaining surface upon inserting the swirl unit into the carrier adjacent to the second locating surfaces.]

[3. A swirl unit as defined in claim 1, wherein the second pair of locating surfaces of the carrier are formed by a bore approximately defined by a first radius, and the peripheral surface is defined at least in part by a second radius selected for slidably contacting the second locating surfaces of the bore upon inserting the swirl unit therein.]

[4. A swirl unit as defined in claim 2, wherein the recessed surface is defined by an approximately planar surface formed on the peripheral surface.]

[5. A swirl unit as defined in claim 1, further defining a tapered surface formed between the peripheral and first end surfaces and tapering inwardly toward the first end surface for facilitating slidable movement of the swirl unit through the carrier.]

[6. A swirl unit as defined in claim 1, further comprising a tool-engaging surface formed on the second end surface and engageable with a tool for pressing the swirl unit toward the orifice plate and rotating the swirl unit and second end surface thereof into a position for engagement with the at least one retaining surface to thereby secure within the carrier the swirl unit and orifice plate.]

[7. A swirl unit as defined in claim 2, wherein the carrier defines at least two retaining surfaces spaced on approximately opposite sides of the carrier relative to each other, and each extending inwardly a predetermined distance for retaining the swirl unit within the carrier, and wherein the peripheral surface of the swirl unit defines at least two recessed surfaces on approximately opposite sides of the swirl unit relative to each other, and each recessed surface is spaced radially inwardly from the at least two locating surfaces of the swirl unit a distance greater than the predetermined distance defined by at least one respective retaining surface for clearing the retaining surfaces upon inserting the swirl unit into the carrier adjacent to the second locating surfaces.]

[8. A swirl unit as defined in claim 1, in further combination with an orifice plate defining a first end surface engageable with the carrier, a second end surface axially spaced relative to the first end surface and engageable with the first end surface of the swirl unit, a spray orifice formed through the orifice plate, and a peripheral surface formed between the first and second end surfaces and dimensioned for slidably contacting the first locating surfaces upon inserting the orifice plate into the carrier.]

[9. A swirl unit and orifice plate as defined in claim 8, wherein the orifice plate further defines a tapered surface at the juncture of the peripheral and first end surfaces for facilitating insertion of the orifice plate into the carrier adjacent to the first locating surfaces.]

[10. A swirl unit for a spray nozzle, wherein the spray nozzle includes a carrier defining a spray aperture on one end for emitting a spray, a first locating bore axially spaced adjacent to the spray aperture for receiving an orifice plate, and a second locating bore formed on an opposite side of the first locating bore relative to the spray aperture for receiving the swirl unit, wherein the swirl unit comprises:

a first end surface engageable with an orifice plate received within the first locating bore; a second end surface axially spaced relative to the first end surface; a peripheral surface formed between the first and second end surfaces; first means for slidably contacting a surface forming the second locating bore upon inserting the swirl unit therein and aligning the swirl unit with the spray aperture; second means for receiving fluid through the swirl unit, and discharging fluid in a swirling pattern therefrom; and third means spaced radially inwardly relative to the first means for defining a fluid passageway between the swirl unit and carrier coupled in fluid communication with the second means to direct fluid into the second means and, in turn, discharge the fluid in a swirling pattern therefrom.]

[11. A swirl unit as defined in claim 10, wherein the carrier further defines at least one retaining surface located on an opposite side of the second locating bore relative to the first locating bore and extending inwardly a predetermined distance for retaining the swirl unit within the carrier, and the third means is defined by at least one recessed surface spaced radially inwardly a distance greater than the predetermined distance defined by the at least one retaining surface of the carrier for clearing the retaining surface upon insertion of the swirl unit into the carrier.]

[12. A swirl unit as defined in claim 10, wherein the first means is defined by at least two locating surfaces formed on approximately opposite sides of the peripheral surface relative to each other, and approximately defined by a radius for slidably contacting the surface forming the second locating bore upon inserting the swirl unit therein.]

[13. A swirl unit as defined in claim 11, further comprising means for engaging a tool for pressing the swirl unit toward the orifice plate and rotating with the tool the swirl unit and second end surface thereof into a position for engagement with the at least one retaining surface to thereby secure within the carrier the swirl unit and orifice plate.]

[14. A spray nozzle, comprising:

a carrier defining a spray aperture on one end for emitting a spray, at least two first locating surfaces spaced on approximately opposite sides of the carrier relative to each other and axially spaced adjacent to the spray aperture for receiving an orifice plate, and at least two second locating surfaces spaced on approximately opposite sides of the carrier relative to each other and formed on an opposite side of the first locating surfaces relative to the spray aperture for receiving a swirl unit;

an orifice plate defining a first end surface engageable with the carrier, a second end surface axially spaced relative to the first end surface, a spray orifice formed through the orifice plate, and a peripheral surface formed between the first and second end surfaces and dimensioned for slidably contacting the first locating surfaces upon insertion of the orifice plate into the carrier; and a swirl unit including a first end surface engageable with the orifice plate received within the carrier adjacent to the first locating surfaces, a second end surface axially spaced relative to the first end surface, a peripheral surface formed between the first and second end surfaces and defining at least two locating surfaces formed on approximately opposite sides of the swirl unit relative to each other and dimensioned for slidably contacting the second locating surfaces of the carrier upon insertion of the swirl unit therein, at least one recessed surface spaced radially inwardly from the at least two locating surfaces of the swirl unit to thereby define a fluid passageway between the swirl unit and carrier; a swirl chamber defined by at least one curvilinear surface formed within the swirl unit, and an inlet port formed in fluid communication between the swirl chamber and fluid passageway and defined at least in part by an inlet surface formed between the at least one curvilinear surface and the recessed surface.]

[15. A spray nozzle as defined in claim 14, wherein the carrier further defines at least one retaining surface located on an opposite side of the second locating surfaces relative to the first locating surfaces and extending inwardly a predetermined distance for retaining the swirl unit within the carrier, and wherein the at least one recessed surface is spaced radially inwardly from the at least two locating surfaces of the swirl unit a distance greater than the predetermined distance defined by the at least one retaining surface of the carrier for clearing the retaining surface upon insertion of the swirl unit into the carrier, and the swirl unit further defines a tool-engaging surface formed on the second end surface and engageable with a tool for pressing the swirl unit toward the orifice plate and rotating the swirl unit and second end surface thereof into a position for engagement with the at least one retaining surface to thereby secure within the carrier the swirl unit and orifice plate.]

[16. A spray nozzle as defined in claim 14, wherein the second locating surfaces of the carrier are formed by a locating bore approximately defined by a first radius, and the peripheral surface of the swirl unit is defined at least in part by a second radius selected for slidably contacting the second locating surfaces upon inserting the swirl unit into the bore.]

[17. A spray nozzle as defined in claim 16, wherein the recessed surface is defined by an approximately planar surface formed on the peripheral surface.]

[18. A spray nozzle as defined in claim 14, wherein the swirl unit further defines a tapered surface formed between the peripheral and first end surfaces and tapering inwardly toward the first end surface for facilitating slidable movement of the swirl unit within the carrier.]

[19. A spay nozzle as defined in claim 14, further comprising at least one nozzle body and wherein the nozzle body is received within the carrier on an approximately opposite side of the swirl unit relative to the orifice plate, the nozzle body defines at least one fluid conduit coupled in fluid communication with the fluid passageway and the swirl chamber for introducing fluid through the swirl unit and orifice plate, and the nozzle body is engageable with the swirl unit for securing the swirl unit and orifice plate within the carrier.]

[20. A spray nozzle as defined in claim 19, including first and second carriers, wherein:

the first carrier defines the at least two first locating surfaces for receiving the orifice plate, and the at least two second locating surfaces for receiving the swirl unit, and is engageable with the second carrier; and the nozzle body is receivable within the second carrier and engageable with the swirl unit received within the first carrier.]

[21. A spray nozzle as defined in claim 20, wherein the second carrier defines an aperture for receiving the first carrier within the second carrier.]

[22. A spray nozzle as defined in claim 20, further comprising at least one sealing member located between the orifice plate and one of the first and second carriers, and wherein the second carrier defines a threaded aperture for receiving the nozzle body, and the nozzle body is threadedly engageable within the threaded aperture to engage the swirl unit and, in turn, compress the sealing member to effect an approximately fluid-tight seal between the orifice plate and respective carrier.]

[23. A spray nozzle as defined in claim 14, wherein the carrier defines at least one inner surface extending in an axial direction of the carrier between the first and second locating surfaces, extending about the periphery of the swirl unit, and spaced radially outwardly from the swirl unit relative to the first and second locating surfaces to facilitate removal of the swirl unit from the carrier.]

[24. A spray nozzle as defined in claim 14, further comprising at least one sealing member located between the orifice plate and the carrier, and wherein the carrier defines a smooth approximately planar sealing surface facing the orifice plate and engageable with the sealing member, and the orifice plate defines an annular recess facing the smooth, approximately planar sealing surface of the carrier for receiving therein the sealing member and preventing the collection of particles on the sealing surface of the carrier.]

[25. A swirl unit as defined in claim 10, wherein the third means is defined by at least one recessed surface spaced radially inwardly relative to the first means to thereby define the fluid passageway between the swirl unit and carrier.]

[26. A swirl unit as defined in claim 25, wherein said at least one recessed surface is approximately planar.]

[27. A swirl unit as defined in claim 10, wherein the second means includes a swirl chamber defined by at least one approximately curvilinear surface, and an inlet port formed in fluid communication between the swirl chamber and fluid passageway.]

*28. A swirl unit for a spray nozzle, wherein the spray nozzle includes a carrier defining a spray aperture on one*

*end for emitting a spray, a first locating surface section for contacting and aligning an orifice plate within the carrier, and a second locating surface section for contacting and aligning the swirl unit within the carrier, wherein the swirl unit comprises:*

*a first end surface engageable with an orifice plate received within the carrier adjacent to the first locating surface section; a second end surface axially spaced relative to the first end surface; a peripheral surface formed between the first and second end surfaces, wherein the peripheral surface defines a locating surface section dimensioned for contacting the second locating surface section of the carrier upon inserting the swirl unit therein and locating the swirl unit within the carrier; a recessed surface defined by the peripheral surface and spaced radially inwardly thereon to thereby define a fluid passageway between the recessed surface and carrier; a swirl chamber defined by an approximately curvilinear surface; and an inlet port formed in fluid communication between the swirl chamber and the recessed surface and defined at least in part by an inlet surface formed between the curvilinear surface and the recessed surface for receiving fluid flowing from the fluid passageway and directing the fluid into the swirl chamber.*

*29. A swirl unit as defined in claim 28, wherein the carrier defines a first pair of locating surface sections formed on approximately opposite sides of the carrier relative to each other for receiving an orifice plate, and a second pair of locating surface sections formed on approximately opposite sides of the carrier relative to each other for receiving the swirl unit, and the peripheral surface of the swirl unit defines at least two locating surface sections formed on approximately opposite sides of the swirl unit relative to each other and dimensioned for contacting the second locating surface sections of the carrier upon inserting the swirl unit therein.*

*30. A swirl unit as defined in claim 28, wherein the recessed surface is defined by an approximately planar surface.*

*31. A swirl unit as defined in claim 28, in further combination with an orifice plate defining a first surface located on one side of the orifice plate and engageable with the carrier, a second surface axially spaced relative to the first surface and engageable with the first end surface of the swirl unit, a spray orifice formed through the orifice plate, and a peripheral surface formed between the first and second surfaces and dimensioned for contacting the first locating surface section upon inserting the orifice plate into the carrier and locating the orifice plate within the carrier.*

*32. A combination as defined in claim 31, further comprising a retaining member defining a retaining surface engageable with the swirl unit for retaining the swirl unit and orifice plate within the carrier.*

*33. A combination as defined in claim 32, wherein the retaining member is engageable with the second end surface of the swirl unit for retaining the swirl unit and orifice plate within the carrier.*

*34. A combination as defined in claim 32, further comprising a sealing member seated between the orifice plate and carrier and forming an approximately fluid-tight seal therebetween.*

*35. A combination as defined in claim 33, wherein the carrier, retaining member, sealing member, orifice plate and swirl unit are locked in a subassembly that can be turned in any direction without the sealing member, orifice plate and swirl unit falling out of the carrier.*

*36. A combination as defined in claim 33, further comprising a nozzle body threadedly engaged with the carrier and defining at least one fluid conduit in fluid communication with the fluid passageway for directing fluid from the at least one fluid conduit into the fluid passageway and, in turn, into the inlet port and swirl chamber.*

*37. A combination as defined in claim 31, wherein the orifice plate defines a first peripheral surface and a second peripheral surface spaced inwardly from the first peripheral surface.*

*38. A swirl unit as defined in claim 28, wherein the second locating surface section of the carrier is spaced on an opposite side of the first locating surface section relative to the spray aperture, and the locating surface section of the peripheral surface of the swirl unit contacts the second locating surface section of the carrier upon inserting the swirl unit therein to locate the swirl unit within the carrier.*

*39. A swirl unit as defined in claim 28, wherein the peripheral surface extends axially from the first end surface to the second end surface.*

*40. A swirl unit as defined in claim 39, wherein the swirl unit is substantially cylindrical.*

*41. A swirl unit as defined in claim 40, wherein the recessed surface is located within the diameter of the peripheral surface.*

*42. A swirl unit as defined in claim 40, wherein the swirl unit defines an axis extending between the first and second end surfaces, the fluid passageway of the recessed surface defines a fluid flow path substantially parallel to the axis, and the inlet port defines a fluid flow path substantially perpendicular to the axis.*

*43. A spray nozzle, comprising:*

*a carrier defining a spray aperture on one end for emitting a spray, a first locating surface section formed on the carrier for contacting and locating the orifice plate within the carrier, and a second locating surface section formed on the carrier for contacting and locating a swirl unit within the carrier;*

*an orifice plate defining a first surface engageable with the carrier, a second surface axially spaced relative to the first surface, a spray orifice formed through the orifice plate, and a peripheral surface formed between the first and second surfaces and dimensioned for contacting the first locating surface section upon insertion of the orifice plate into the carrier to locate the orifice plate within the carrier; and*

*a swirl unit including a first end surface engageable with the orifice plate received within the carrier adjacent to the first locating surface section, a second end surface axially spaced relative to the first end surface, a peripheral surface formed between the first and second end surfaces and defining a locating surface section dimensioned for contacting the second locating surface section of the carrier upon insertion of the swirl unit therein and locating the swirl unit within the carrier, a recessed surface defined by the peripheral surface and spaced radially inwardly thereon to thereby define a fluid passageway between the recessed surface and carrier, a swirl chamber defined by at least one curvilinear surface formed within the swirl unit, and an inlet port formed in fluid communication between the swirl chamber and the recessed surface and defined at least in part by an inlet surface formed between the at least one curvilinear surface and the recessed surface for receiving fluid flowing from the fluid passageway and directing the fluid into the swirl chamber.*

*44. A spray nozzle as defined in claim 43, wherein the second locating surface section of the carrier is formed by a*

*locating bore approximately defined by a first radius, and the peripheral surface of the swirl unit is defined at least in part by a second radius that contacts the second locating surface section upon inserting the swirl unit into the bore and locates the swirl unit within the carrier.*

*45. A spray nozzle as defined in claim 43, wherein the recessed surface of the swirl unit is defined by an approximately planar surface.*

*46. A spray nozzle as defined in claim 43, further comprising a retaining member defining a retaining surface engageable with the swirl unit for retaining the swirl unit and orifice plate within the carrier.*

*47. A spray nozzle as defined in claim 46, wherein the retaining member is engageable with the second end surface of the swirl unit for retaining the swirl unit and orifice plate within the carrier.*

*48. A spray nozzle as defined in claim 46, wherein the carrier, retaining member, orifice plate and swirl unit are locked in a subassembly that can be turned in any direction without the sealing member, orifice plate and swirl unit falling out of the carrier.*

*49. A spray nozzle as defined in claim 43, further comprising a nozzle body threadedly engaged with the carrier and defining at least one fluid conduit in fluid communication with the fluid passageway for directing fluid from the at least one fluid conduit through the fluid passageway, the inlet port, the swirl chamber and, in turn, through the spray orifice of the orifice plate.*

*50. A spray nozzle as defined in claim 43, wherein the peripheral surface of the swirl unit extends axially from the first end surface to the second end surface.*

*51. A spray nozzle as defined in claim 50, wherein the swirl unit is substantially cylindrical.*

*52. A spray nozzle as defined in claim 51, wherein the recessed surface is located within the diameter of the peripheral surface.*

*53. A spray nozzle as defined in claim 43, wherein the swirl unit defines an axis extending between the first and second end surfaces, the fluid passageway of the recessed surface defines a fluid flow path substantially parallel to the axis, and the inlet port defines a fluid flow path substantially perpendicular to the axis.*

*54. A method comprising the following steps:*

*providing a carrier defining a spray aperture on one end for emitting a spray, a first locating surface section formed on the carrier for contacting and locating an orifice plate within the carrier, and a second locating surface section formed on the carrier for contacting and locating a swirl unit within the carrier;*

*providing an orifice plate defining a first surface engageable with the carrier, a second surface axially spaced relative to the first surface, a spray orifice formed through the orifice plate, and a peripheral surface formed between the first and second surfaces and dimensioned for contacting the first locating surface section upon insertion of the orifice plate into the carrier;*

*providing a swirl unit including a first end surface engageable with the orifice plate received within the carrier adjacent to the first locating surface section, a second end surface axially spaced relative to the first end surface, a peripheral surface formed between the first and second end surfaces and defining a locating surface section dimensioned for contacting the second locating surface section of the carrier upon insertion of the swirl unit therein, a recessed surface defined by the peripheral surface and spaced radially inwardly thereon to thereby define a fluid passageway between the recessed surface and carrier, a swirl chamber defined by at least one curvilinear surface formed within the swirl unit, and an inlet port formed in fluid communication between the swirl chamber and the recessed surface and defined at least in part by an inlet surface formed between the at least one curvilinear surface and the recessed surface;*

*providing a nozzle body defining at least one fluid conduit coupled in fluid communication with the fluid passageway;*

*inserting the orifice plate into the carrier, contacting the peripheral surface of the orifice plate with the first locating surface section of the carrier and thereby locating the orifice plate within the carrier, inserting the swirl unit within the carrier, contacting the peripheral surface of the swirl unit with the second locating surface section of the carrier and thereby locating the swirl unit within the carrier, and assembling the nozzle body to the carrier; and*

*introducing fluid through the at least one fluid conduit of the nozzle body, through the fluid passageway formed between the recessed surface and carrier in a direction substantially parallel to an axis extending between the first and second end surfaces of the swirl unit, through the inlet port in a direction substantially perpendicular to the axis, through the swirl chamber and, in turn, through the spray orifice of the orifice plate.*

*55. A method as defined in claim 54, further comprising:*

*providing a retaining member defining a retaining surface engageable with the swirl unit; and*

*prior to assembling the nozzle body to the carrier, engaging the carrier with the retaining surface and, in turn, locking the carrier, retaining member, orifice plate and swirl unit in a subassembly that can be turned in any direction without the sealing member, orifice plate and swirl unit falling out of the carrier.*

*56. A method as defined in claim 54, wherein the peripheral surface of the swirl unit is substantially cylindrical, the second locating surface section is defined by a substantially cylindrical surface, and the recess and fluid passageway are located within the diameter of the cylindrical peripheral surface.*

* * * * *